United States Patent
Lee et al.

(10) Patent No.: US 10,693,992 B2
(45) Date of Patent: Jun. 23, 2020

(54) APPARATUS AND METHOD FOR PROVIDING STREAMING SERVICE

(71) Applicant: Samsung Electronics Co., Ltd., Gyeonggi-do (KR)

(72) Inventors: Okseon Lee, Suwon-si (KR); Dojun Byun, Seoul (KR); Sinseok Seo, Montigny-le-Bretonneux (FR); Youngsuk Sun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 120 days.

(21) Appl. No.: 15/716,321

(22) Filed: Sep. 26, 2017

(65) Prior Publication Data

US 2018/0091618 A1 Mar. 29, 2018

(30) Foreign Application Priority Data

Sep. 26, 2016 (KR) ........................ 10-2016-0122915

(51) Int. Cl.
*H04L 29/08* (2006.01)
*H04L 29/06* (2006.01)

(52) U.S. Cl.
CPC ...... *H04L 67/2847* (2013.01); *H04L 65/4084* (2013.01); *H04L 65/4092* (2013.01); *H04L 65/601* (2013.01); *H04L 65/608* (2013.01); *H04L 65/80* (2013.01)

(58) Field of Classification Search
CPC ............. H04L 67/2847; H04L 65/4092; H04L 65/4084; H04L 65/80; H04L 65/601; H04L 65/608; H04L 29/06455; H04N 21/23805; H04N 21/2385; H04N 21/2387; H04N 21/6437
See application file for complete search history.

(56) References Cited

U.S. PATENT DOCUMENTS

| | | | | |
|---|---|---|---|---|
| 7,411,901 | B1* | 8/2008 | Alexander | H04L 47/10 370/230 |
| 10,116,713 | B2* | 10/2018 | Chen | H04L 47/6295 |
| 2004/0039834 | A1* | 2/2004 | Saunders | H04L 29/06 709/231 |
| 2004/0267952 | A1* | 12/2004 | He | H04L 29/06027 709/231 |

(Continued)

FOREIGN PATENT DOCUMENTS

KR 20020021415 A * 3/2002

*Primary Examiner* — Kostas J Katsikis

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. In an embodiment, an operating method of a terminal that provides a streaming service includes detecting a streaming operation for the streaming service, performing a streaming acceleration, based on the detected streaming operation, and sharing a rule associated with the streaming acceleration with a server.

16 Claims, 9 Drawing Sheets

(56) References Cited

U.S. PATENT DOCUMENTS

| | | | |
|---|---|---|---|
| 2008/0133877 A1* | 6/2008 | Chai | G06F 9/345 |
| | | | 711/218 |
| 2008/0285571 A1* | 11/2008 | Arulambalam | H04L 29/06027 |
| | | | 370/400 |
| 2012/0008768 A1* | 1/2012 | Mundra | H04L 9/0637 |
| | | | 380/28 |
| 2012/0011351 A1* | 1/2012 | Mundra | G06F 21/72 |
| | | | 713/1 |
| 2013/0297814 A1* | 11/2013 | Annamalaisami | H04L 69/08 |
| | | | 709/230 |
| 2014/0101306 A1* | 4/2014 | Murgia | H04L 47/125 |
| | | | 709/224 |
| 2014/0289445 A1* | 9/2014 | Savich | G06F 13/4022 |
| | | | 710/317 |
| 2015/0358689 A1 | 12/2015 | Wen et al. | |
| 2016/0094614 A1* | 3/2016 | Ulupinar | H04L 65/4084 |
| | | | 709/219 |
| 2016/0337426 A1* | 11/2016 | Shribman | H04L 65/4084 |
| 2017/0012906 A1* | 1/2017 | Szilagyi | H04L 49/9005 |
| 2017/0289213 A1* | 10/2017 | Chen | H04L 47/6295 |
| 2018/0367516 A1* | 12/2018 | Mundra | H04L 63/0428 |

* cited by examiner

APPARATUS AND METHOD FOR PROVIDING STREAMING SERVICE

CROSS-REFERENCE TO RELATED APPLICATION AND CLAIM OF PRIORITY

The present application is related to and claims priority to Korean Patent Application No. 10-2016-0122915 filed on Sep. 26, 2016, the contents of which are incorporated herein by reference.

TECHNICAL FIELD

The present disclosure relates to a method for efficiently coping with a change in a streaming service application and a change in a network situation when a media file located at a server is played back at a user's electronic device at a user's request.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Typically, methods for using various kinds of content services through a data communication network may be divided into a download method and a streaming method. The streaming method includes an adaptive streaming method.

The content service collectively refers to services that provide various kinds of digital media data such as broadcast, movie, music, and the like. The digital media data refers to digital information such as sound, image, and the like created for corresponding digital content.

The streaming method is to continuously provide digital media data in real time for a desired content service. Therefore, the streaming method is mainly used for a content service corresponding to a real-time broadcast such as a long video or a sports broadcast.

The adaptive streaming method, which is one type of the streaming method, is to transmit digital media data by adjusting the quality or the like of data to suitably change the amount of data, depending on situations of the data communication network.

SUMMARY

To address the above-discussed deficiencies, it is a primary object to provide a method and apparatus for reducing a delay time of initial streaming and also reducing buffering during streaming.

According to various embodiments of the present disclosure, an operating method of a terminal providing a streaming service comprises detecting a streaming operation for the streaming service, performing a streaming acceleration, based on the detected streaming operation, and sharing a rule associated with the streaming acceleration with a server.

The detecting a streaming operation may include checking whether the streaming service is a streaming acceleration supportable service, and identifying a request type for the streaming service when the streaming service is a streaming acceleration supportable service.

The operating method of the terminal may further comprise estimating a network status including at least one of a bandwidth and a per-session throughput, wherein the streaming acceleration may be performed according to the request type for the streaming service and the network status.

The performing a streaming acceleration may include determining, based on the network status, the number of multiple sessions for simultaneously receiving at least one of metadata and streaming data from a streaming server, and pre-fetching, using the number of multiple sessions, at least one of the metadata and the streaming data in units corresponding to the request type for the streaming service.

In one embodiment, the pre-fetching may be performed in a file unit when the request type for the streaming service is a file based request.

In another embodiment, the pre-fetching may be performed in a byte unit when the request type for the streaming service is a byte based request.

The pre-fetching may include pre-fetching a child playlist by using a master playlist received from the streaming server, and pre-fetching the streaming data for the child playlist requested by a streaming application.

The master playlist may include a bitrate list with respect to the streaming data.

The child playlist may include a video fragment file list.

The operating method of the terminal may further comprise calculating, using the metadata, a size of the streaming data to be requested from the streaming server.

The operating method of the terminal may further comprise setting an activation condition for the streaming acceleration, and performing the streaming acceleration when the activation condition is satisfied.

According to various embodiments of the present disclosure, a terminal providing a streaming service comprises a transceiver configured to transmit and receive signals, and a controller configured to detect a streaming operation for the streaming service, to perform a streaming acceleration based on the detected streaming operation, and to share a rule associated with the streaming acceleration with a server.

The above method and apparatus for providing a streaming service may reduce a delay time of initial streaming, reduce buffering during streaming, and provide a high-quality streaming service by using a streaming acceleration scheme considering a streaming service operation and a network status.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
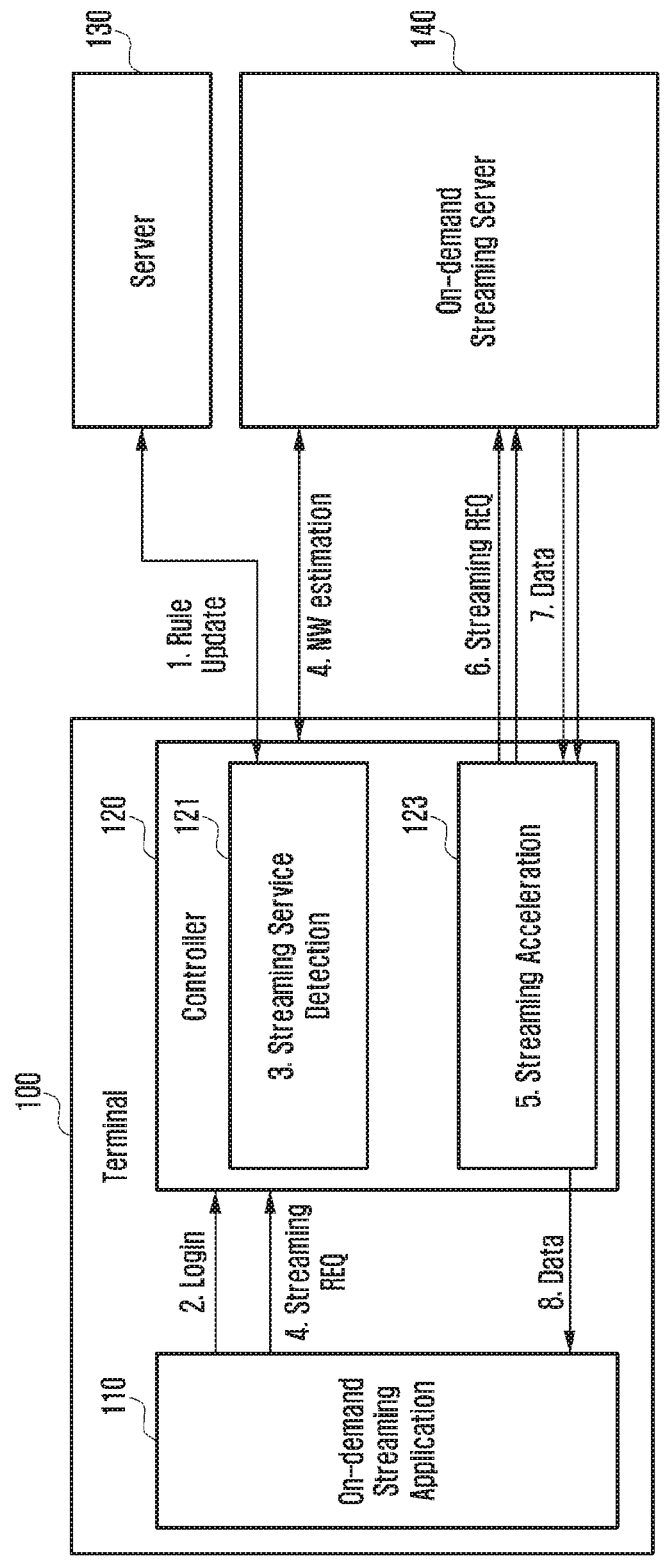
FIG. 1 illustrates a block diagram of a system for providing a streaming service according to an embodiment of the present disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In describing the embodiments, descriptions of techniques which are well known in the art to which the present disclosure belongs and which are not directly related to the present disclosure will not be described or illustrated in detail. This is to avoid obscuring the subject matter of the present disclosure.

For the same reason, some elements are exaggerated, omitted or schematically shown in the accompanying drawings. Also, the size of each element does not entirely reflect the actual size. In the drawings, the same or corresponding elements are denoted by the same reference numerals.

The advantages and features of the present disclosure and the manner of achieving them will become apparent with reference to the embodiments described in detail below with reference to the accompanying drawings. The present disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. To fully disclose the scope of the disclosure to those skilled in the art, and the disclosure is only defined by the scope of the claims.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, may refer to a software or hardware component or device, such as a field programmable gate array (FPGA) or application specific integrated circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

Hereinafter, embodiments of the present disclosure will be described in detail with reference to the accompanying drawings. In the following description, well-known elements and functions may not be described or illustrated avoid obscuring the subject matter of the present disclosure. Also, terms used herein are defined in consideration of functions of the present disclosure, and may be changed according to the intention of a user, an operator, or the like. Therefore, the definition should be based on the contents throughout this specification.

FIG. 1 illustrates a block diagram of a system for providing a streaming service according to an embodiment of the present disclosure.

Referring to FIG. 1, the system may include a terminal 100, a server 130, and an on-demand streaming server 140.

The terminal 100 refers to an apparatus or electronic device that receives a request for a streaming service from a user. The server 130 refers to an apparatus or electronic device that shares a predetermined rule related to a streaming service with the terminal 100 to efficiently perform the streaming service.

The on-demand streaming server 140 refers to an apparatus or electronic device that receives a request for a streaming service from the terminal 100 and transmits data (e.g., a video file) to the terminal 100 in response to the request.

In order to provide a streaming service to a user, an on-demand streaming application 110 installed in the terminal 100 may be executed. The terminal 100 may include a controller 120 for supporting (or controlling) the streaming service. According to an embodiment, the controller 120 may be implemented as a proxy.

The controller 120 may share a streaming acceleration rule with the server 130 which is implemented outside the terminal. The streaming acceleration rule may be updated and shared among a plurality of terminals including the terminal 100.

The streaming acceleration rule may refer to a particular rule for providing an optimal streaming service to the terminal 100 by reflecting a change in the network status detected by each of the plurality of terminals.

The server 130 may store the streaming acceleration rule to be applied to the plurality of terminals, and may transmit the streaming acceleration rule to each of the plurality of terminals.

The controller 120 may detect a user's log-in through the on-demand streaming application 110, and may identify a streaming service corresponding to the on-demand streaming application 110. In addition, when a streaming operation of a specific streaming service is changed, the controller 120 may detect it.

The on-demand streaming application 110 may send a request for streaming data to the controller 120.

The controller 120 may share network status monitoring with the on-demand streaming server 140. The network status monitoring may be to detect a status of a network including a plurality of terminals such as the terminal 100. Any parameter related to the streaming acceleration may be adjusted through the network status monitoring.

The controller 120 may determine the streaming acceleration, based on at least one of the streaming acceleration rule shared with the server 130 and the network status monitoring shared with the on-demand streaming server 140.

The streaming acceleration may refer to at least one of pre-fetching and multi-session related to streaming data (e.g., a video file). For example, the controller 120 may reduce buffering and maintain a high-quality streaming service through metadata-based pre-fetching.

The controller 120 may send a request for streaming data to the on-demand streaming server 140, based on the determined streaming acceleration. In response to this request, the on-demand streaming server 140 may transmit the streaming data to the controller 120.

The controller 120 may provide a streaming service to a user by transmitting the streaming data to the on-demand streaming application 110.

Figure 2:
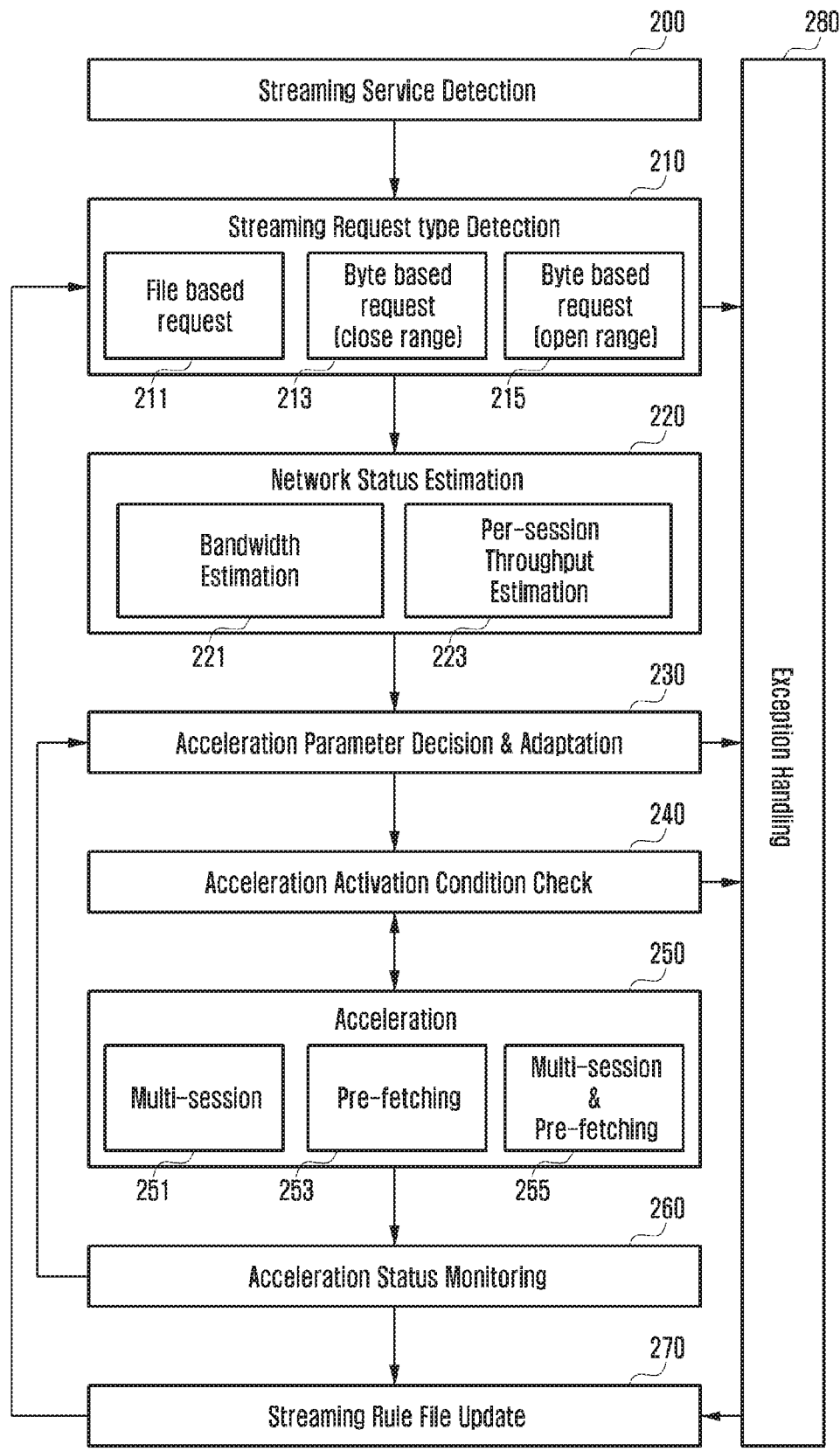
FIG. 2 illustrates a block diagram of operations of a controller for providing a streaming service according to an embodiment of the present disclosure.

FIG. 2 illustrates a block diagram of operations of a controller for providing a streaming service according to an embodiment of the present disclosure.

Referring to FIGS. 1 and 2, at block 200, the controller 120 may detect a streaming service. There are three embodiments for performing the streaming service detection, as follows.

According to one embodiment, the streaming service detection may be performed through a white list based approach. In accordance with the white list based approach, the controller 120 may detect a foreground application and then determine whether the foreground application can support the streaming acceleration.

According to another embodiment, the streaming service detection may be performed through a signature based approach. In accordance with the signature based approach, the controller 120 may detect a signature from a target uniform resource identifier (target URI) of a streaming request of an on-demand streaming service and then determine whether the on-demand streaming service can support the streaming acceleration.

In the signature based approach, the controller 120 may determine whether the service is a streaming acceleration supportable service, by using a mapping relationship between a service and a signature in URI as shown in Table 1 below.

TABLE 1

| Service | Signature in URI |
|---|---|
| YouTube | (https) "googlevideo", "videoplayback" |
| Netflix | "nflixvideo", length of URI > X |
| DirecTV | "directv" for VoD |
|  | "directv" & "livetv" for live |
|  | "espn.go.com" for ESPN |
| Amazon | "cloudfront": Amazon CDN |
| Dailymotion | "dailymotion" or "dmcdn" |
| Crackle | "crackle" |
| Vevo | "vevo" |
| Hulu | "hulu" |
| HBO Now | 'hbo" |
| Twitch | TBO |
| WWE | "wwe" |
| Ustream | "ustream" |
| VUDU | "vudu" |
| Vimeo | TBD |
| Yahoo! Screen | TBD |
| Fox Now | "Fox.com" |
| Disney | "disney" |
| CBS | "CBS" |
| CTV | "CTV" |
| ESPN | "espn" |
| Sling | "movetv.com" |

According to yet another embodiment, the streaming service detection may be performed through a file type based approach. In accordance with the file type based approach, the controller 120 may detect a video file type from a target URI of a streaming request of an on-demand streaming service and then determine whether the service can support the streaming acceleration. For example, the video file type may be m3u8, mp4, flv, ts, and the like.

At block 210, the controller 120 may detect a streaming request type.

According to one embodiment, if the streaming service detection is performed through a file type based approach, the streaming request type may be a file based request 211. In this case, the file based request 211 means that the on-demand streaming application requests streaming data on a file-by-file basis.

The file based request 211 may refer to HTTP GET REQ for a video streaming file type, and the video streaming file type may be ts, mp4, flv, and the like.

According to another embodiment, the streaming request type may be a byte based request. In this case, the byte based request means that the on-demand streaming application requests streaming data on a byte-by-byte basis.

The byte based request may be HTTP GET REQ with a closed range 213 or HTTP GET REQ with an open range 215.

At block 220, the controller 120 may estimate (or evaluate) a network status.

The controller 120 may periodically estimate the network status. The network state may be bandwidth throughput or per-session throughput. The bandwidth throughput may be estimated at a simultaneous request of multiple sessions, and the per-session throughput may be estimated at a request of a single session. The estimation may be an average, a peak, a variance, a standard deviation, and the like.

The controller 120 may transmit a streaming request to the target URI of the streaming data and estimate the network status through the downloaded data amount.

At this time, if there is any currently available URI (the existing target URI of the on-demand streaming service), the controller 120 may utilize this URI. If there is no available URI, the controller 120 may use a new URI requested by the application.

At block 230, the controller 120 may determine an acceleration parameter associated with streaming acceleration and apply the acceleration parameter.

The controller 120 may determine, as an acceleration parameter, the number of sessions (NumMultiSession) for simultaneous data reception using multiple sessions. The number of sessions (NumMultiSession) may be calculated as shown in Equation 1 below.

$$NumMultiSession = \frac{EstBW}{EstPST} \times \frac{EstAdjustFactor}{NumAppSession} \qquad \text{[Equation 1]}$$

EstBW denotes estimated bandwidth, and EstPST denotes estimated per-session throughput. EstAdjustFactor denotes a factor determined according to a certain condition as shown in Equation 2, and NumAppSession denotes the number of application sessions.

EstAdjustFactor=1.0 if
　　FlucutationRatioOfPST<=AllowedStdDevOfPSToverBW

FluctuationRatioOfPST=(PST standard deviation)/
　　BW

EstAdjustFactor=1−(PST standard deviation)/BW if
　　FluctuationRatioOfPST>AllowedStdDev
　　OfPSToverBW　　　　　　　　　　　　　　　[Equation 2]

The controller 120 may determine, as an acceleration parameter, pre-fetching to reduce buffering by receiving streaming-expected data in advance.

If the streaming request type is a file based request, the controller 120 may pre-fetch streaming data on a file basis (NumPrefetchFiles=[default, minimum, maximum]).

<NumPrefetchFiles Increase Condition>
① Pre-fetch Success Rate>THforIncreasePrefetch (Pre-fetch Success Rate: The rate at which an application requests a pre-fetching file from proxy)
② And/or Fluctuation Ratio of Per-session Throughput equal to or smaller than a given value: FluctuationRatioOfPST<=AllowedStdDevOfPSToverBW
③ And/or Fluctuation Ratio of Bandwidth Throughput equal to or smaller than a given value: FluctuationRatioOfBW<=AllowedStdDevOfBW
<NumPrefetchFiles Decrease Condition>
① Pre-fetch Success Rate<THforDereasePrefetch
② And/or Fluctuation Ratio of Per-session Throughput greater than a given value: FluctuationRatioOfPST>AllowedStdDevOfPSToverBW
③ And/or Fluctuation Ratio of Bandwidth Throughput greater than a given value: FluctuationRatioOfBW>AllowedStdDevOfBW According to another embodiment, the controller 120 may perform pre-fetching to only a part of a streaming-expected file as shown in Equation 3 below.

ProxyReqSize=ExpectedFileSize+PrefetchSize

ExpectedFileSize=BANDWIDTH×TARGETDURATION/8 [byte]

PrefetchSize=[default,minimum,maximum]  [Equation 3]

<PrefetchSize Increase Condition>
Same as NumPrefetchFiles Increase Condition, increasing by the given IncreasePortion
<PrefetchSize Decrease Condition>
Same as NumPrefetchFiles Decrease Condition, decreasing by the given DecreasePortion If the streaming request type is a byte based request, the controller 120 may pre-fetch streaming data on a byte basis as shown in Equation 4 below.

Close range: ProxyReqSize=AppReqSize+PrefetchSize

Open range: ProxyReqSize=DefaultReqSize+PrefetchSize  [Equation 4]

Same as the above PrefetchSize determination

At block 240, the controller 120 may determine whether to activate acceleration, according to an acceleration activation condition as shown in Equation 5 below. When the condition of Equation 5 is not satisfied, the controller 120 may relay the data rather than accelerate.

NumMultiSessions>=2

ProxyReqSize>MinMultiSessionBytes  [Equation 5]

At block 250, the controller 120 may perform acceleration, based on the acceleration parameter determined at block 230. The acceleration may refer to performing one of multi-session 251, pre-fetching 253, and multi-session and pre-fetching 255.

At block 260, the controller 120 may monitor an acceleration status. The controller 120 may monitor the success rate of pre-fetching, based on update when the application is terminated or the streaming data target URI is changed. The pre-fetching success rate may refer to a rate at which the application requests a pre-fetching file from the controller 120.

At block 270, the controller 120 may update a streaming rule file. The update may be performed through transmission/reception of corresponding data between the controller 120 and the server 130. When a new streaming service or a change in a streaming method of a known service is detected, the controller 120 may notify this to the server 130. At this time, the server 130 may share the acceleration rule with another terminal.

At block 280, the controller 120 may handle the occurrence of an exceptional situation. The controller 120 may report the occurrence of the exceptional situation to the server, and may perform a relay for the streaming request.

Figure 3:
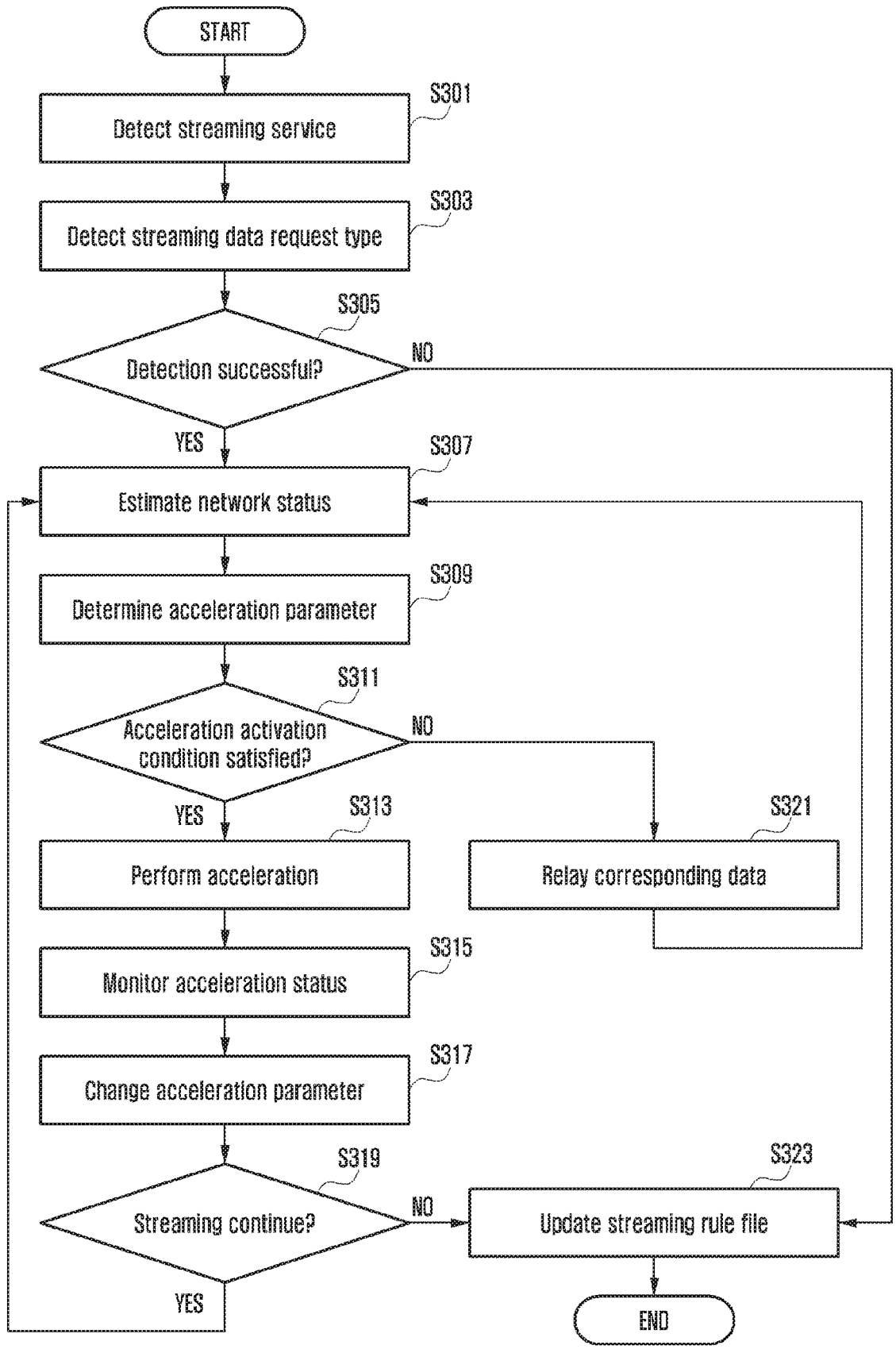
FIG. 3 illustrates a flow diagram of an operating method of a terminal according to an embodiment of the present disclosure.

FIG. 3 illustrates a flow diagram of an operating method of a terminal according to an embodiment of the present disclosure.

At step S301, the terminal may detect a streaming operation for a certain streaming service, and may check whether the streaming service is a streaming acceleration supportable service.

At step S303, if the streaming service is the streaming acceleration supportable service, the terminal may detect a request type for the streaming service.

At step S305, the terminal may determine whether the detection of the request type is successful.

If the detection of the request type is successful, the terminal may estimate a network status including at least one of a bandwidth and a per-session throughput at step S307. The streaming acceleration of the terminal may be performed according to the request type for the streaming service and the network status.

At step S309, the terminal may determine an acceleration parameter, based on the estimated network status.

At step S311, the terminal may set an activation condition for the streaming acceleration. If the activation condition is satisfied, the terminal may perform the streaming acceleration at step S313.

The terminal may determine, based on the network status, the number of multiple sessions for simultaneously receiving at least one of metadata and streaming data from the streaming server. Using the number of multiple sessions, the terminal may pre-fetch at least one of the metadata and the streaming data in units corresponding to the request type for the streaming service.

According to one embodiment, if the request type for the streaming service is a file based request, the terminal may pre-fetch at least one of the metadata and the streaming data in a file unit.

According to another embodiment, if the request type for the streaming service is a byte based request, the terminal may pre-fetch at least one of the metadata and the streaming data in a byte unit.

The terminal may pre-fetch a child playlist by using a master playlist received from the streaming server, and may pre-fetch the streaming data for the child playlist requested by the streaming application.

According to an embodiment, using the metadata, the terminal may calculate the size of streaming data to be requested from the streaming server.

If the activation condition is not satisfied at step S311, the terminal may relay the corresponding data at step S321.

The terminal may monitor an acceleration status at step S315, and may adaptively change the acceleration parameter according to the monitoring result at step S317.

At step S319, the terminal may determine whether the streaming continues. If the streaming continues, the terminal may return to step S307 and perform the subsequent process.

If it is determined at step S319 that the streaming does not continue, the terminal may update a streaming rule file at step S323. At this time, the terminal may share the streaming rule file with an externally implemented server.

Figure 4:
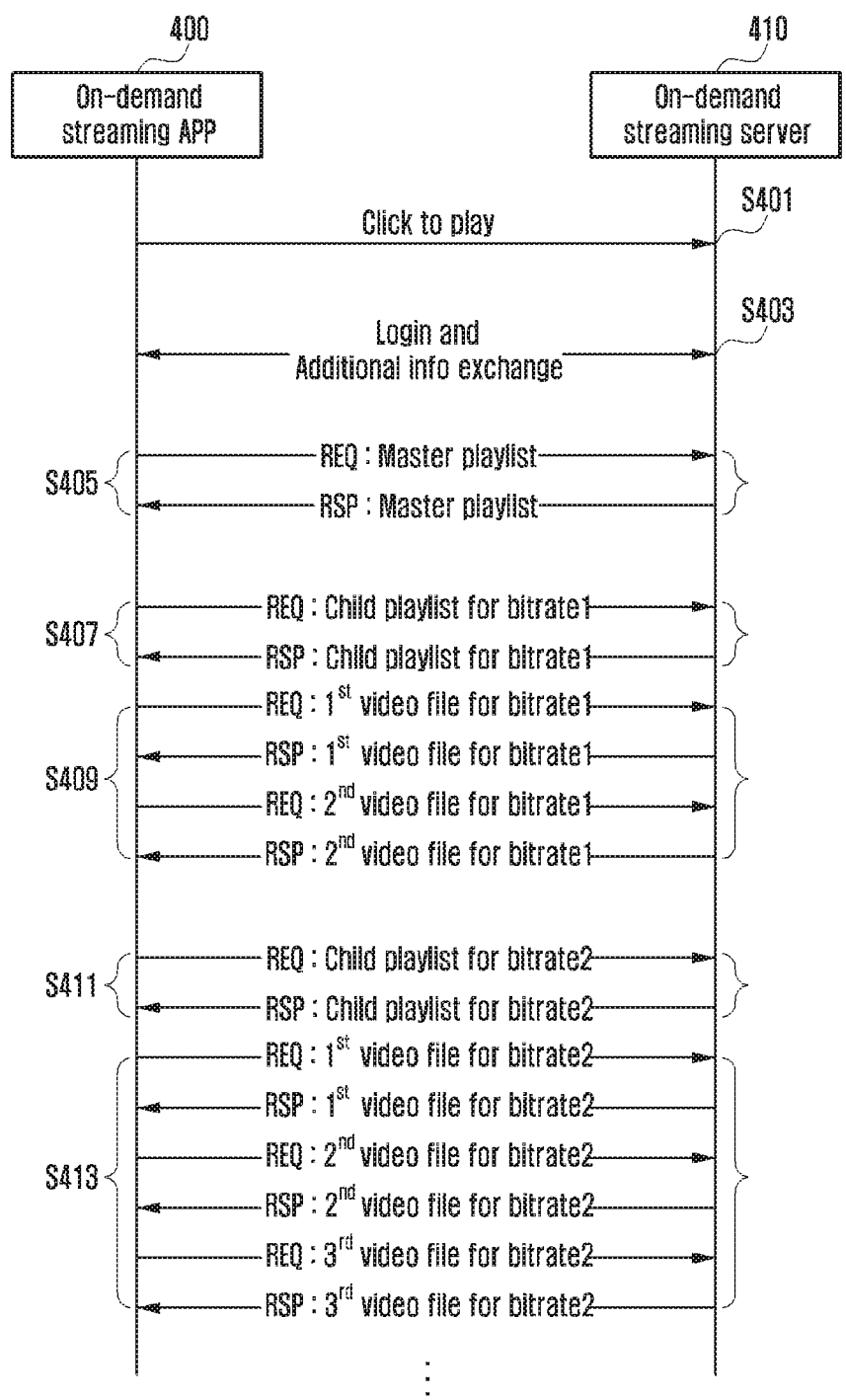
FIG. 4 illustrates a sequence diagram of streaming based on a fragment file list of each bitrate.

FIG. 4 illustrates a sequence diagram of a streaming based on a fragment file list of each bitrate.

In case of a streaming service that provides multi-bitrate, the terminal may request metadata from the server. The metadata may include a master playlist and a child playlist.

In this case, the master playlist may refer to a bitrate list provided by the server for the requested streaming data (e.g., a video). The child playlist may refer to a fragmented file list of each bitrate.

Therefore, the server may provide only a fragment file list of the bitrate requested by the terminal, and then provide a fragment file of the bitrate requested by the terminal.

Referring to FIG. 4, at step S401, an on-demand streaming application 400 may send a request for streaming data to an on-demand streaming server 410 in response to a click to play.

At step S403, the on-demand streaming application 400 may log in the on-demand streaming server 410, and both of them may exchange additional information with each other.

At step S405, the on-demand streaming application 400 may send a request for a master playlist to the on-demand streaming server 410. In response to this request, the on-demand streaming server 410 may transmit the master playlist to the on-demand streaming application 400.

At step S407, the on-demand streaming application 400 may send a request for a first child playlist for a first bitrate to the on-demand streaming server 410. In response to this request, the on-demand streaming server 410 may transmit the first child playlist to the on-demand streaming application 400.

The first child playlist is a fragment file list for the first bitrate and may include a first video file and a second video file.

At step S409, the on-demand streaming application 400 may send a request for the first video file for the first bitrate to the on-demand streaming server 410. In response to this request, the on-demand streaming server 410 may transmit the first video file to the on-demand streaming application 400.

At step S409, the on-demand streaming application 400 may also send a request for the second video file for the first bitrate to the on-demand streaming server 410. In response to this request, the on-demand streaming server 410 may transmit the second video file to the on-demand streaming application 400.

At step S411, the on-demand streaming application 400 may send a request for a second child playlist for a second bitrate to the on-demand streaming server 410. In response to this request, the on-demand streaming server 410 may transmit the second child playlist to the on-demand streaming application 400.

The second child playlist is a fragment file list for the second bitrate and may include a first video file, a second video file, and a third video file.

At step S413, the on-demand streaming application 400 may send a request for the first video file for the second bitrate to the on-demand streaming server 410. In response to this request, the on-demand streaming server 410 may transmit the first video file to the on-demand streaming application 400.

At step S413, the on-demand streaming application 400 may also send a request for the second video file for the second bitrate to the on-demand streaming server 410. In response to this request, the on-demand streaming server 410 may transmit the second video file to the on-demand streaming application 400.

At step S413, the on-demand streaming application 400 may further send a request for the third video file for the second bitrate to the on-demand streaming server 410. In response to this request, the on-demand streaming server 410 may transmit the third video file to the on-demand streaming application 400.

Figure 5:
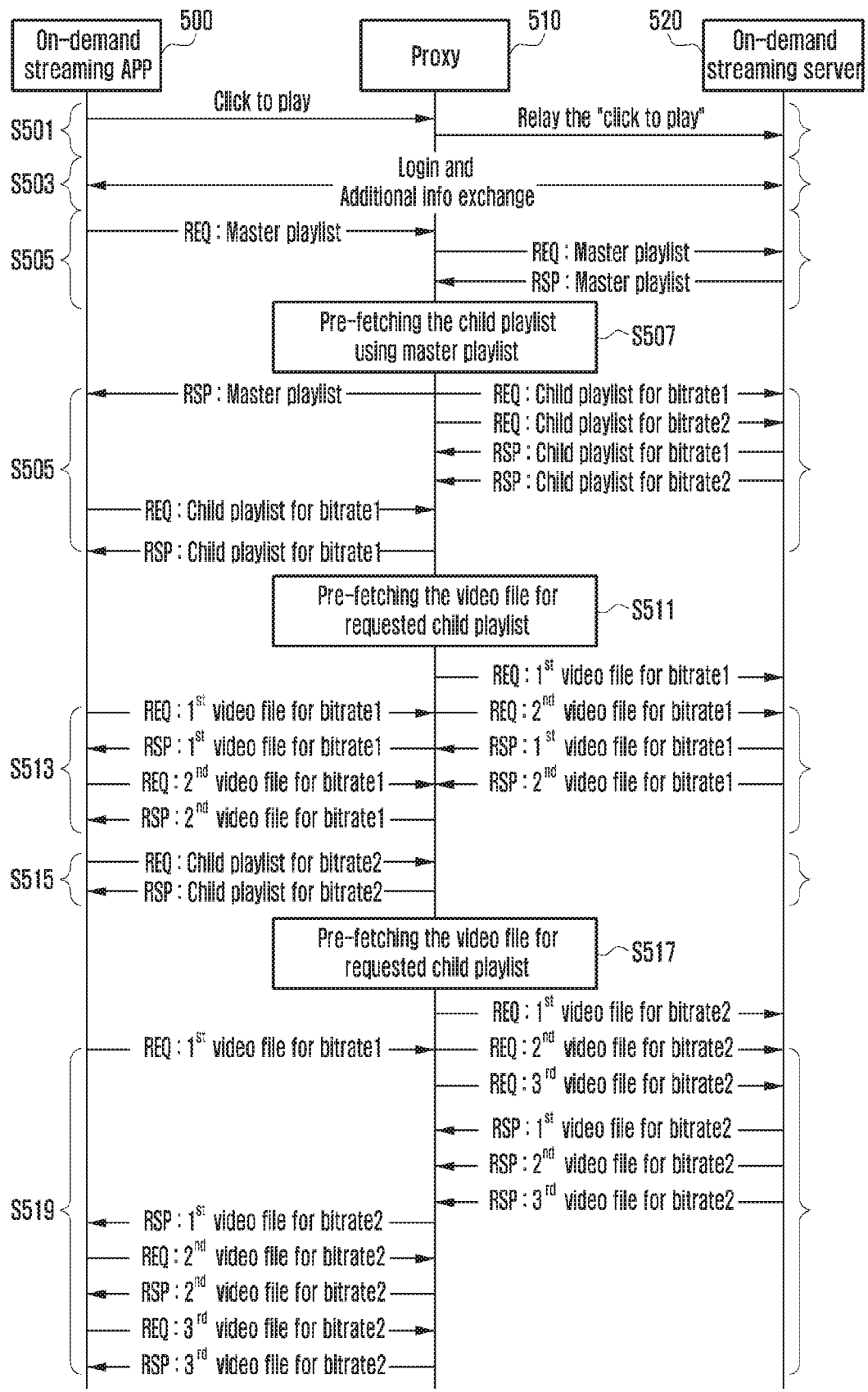
FIG. 5 illustrates a sequence diagram of streaming based on a fragment file list of each bitrate according to an embodiment of the present disclosure.

FIG. 5 illustrates a sequence diagram of streaming based on a fragment file list of each bitrate according to an embodiment of the present disclosure.

When the terminal requests a master playlist, the present disclosure provides, using a proxy, pre-fetching of a child playlist provided in the master playlist. Therefore, when the terminal requests the child playlist, the present disclosure may save time for loading the child playlist from the server.

In addition, using the proxy, the present disclosure provides pre-fetching of a corresponding bitrate fragment file provided in the child playlist, thereby saving time for loading the fragment file from the server when the terminal requests the fragment file.

Accordingly, the present disclosure may prevent buffering during streaming, and may also provide a high-resolution video even if the network situation suddenly deteriorates.

Referring to FIG. 5, at step S501, an on-demand streaming application 500 may send a request for streaming data to an on-demand streaming server 520 via the proxy 510 in response to a click to play.

At step S503, the on-demand streaming application 500 may log in the on-demand streaming server 520 via the proxy 510, and may exchange additional information.

At step S505, the on-demand streaming application 500 may send a request for the master playlist to the proxy 510. Then the proxy 510 may deliver the request to the on-demand streaming server 520 and receive the master playlist from the on-demand streaming server 520.

At step S507, the proxy 510 may pre-fetch the child playlist provided in the master playlist by using the master playlist received from the on-demand streaming server 520.

At step S509, the proxy 510 may transmit the master playlist to the on-demand streaming application 500. Additionally, the proxy 510 may send a request for a first child playlist for a first bitrate and a second child playlist for a second bit rate to the on-demand streaming server 520. Then, the proxy 510 may receive the first child playlist and the second child playlist from the on-demand streaming server 520.

At step S509, if the proxy 510 receives a request for the first child playlist for the first bitrate from the on-demand streaming application 500, the proxy 510 may transmit the pre-fetched first child playlist to the on-demand streaming application 500.

At step S511, the proxy 510 may pre-fetch the video file for the first child playlist requested by the on-demand streaming application 500.

At step S513, the proxy 510 may receive a request for a first video file for the first bitrate from the on-demand streaming application 500. Then, the proxy 510 may send a request for the first video file and a second video file for the first bitrate to the on-demand streaming server 520. In response to this request, the proxy 510 may receive the first video file and the second video file from the on-demand streaming server 520.

At step S513, the proxy 510 may transmit the first video file to the on-demand streaming application 500. Thereafter, when the proxy 510 receives a request for the second video file from the on-demand streaming application 500, the proxy 510 may transmit the pre-fetched second video file to the on-demand streaming application 500.

At step S515, the proxy 510 may receive a request for the second child playlist for the second bitrate from the on-demand streaming application 500. At this time, the proxy 510 may transmit the second child playlist pre-fetched at step S509 to the on-demand streaming application 500.

At step S517, the proxy 510 may pre-fetch the video file for the second child playlist requested by the on-demand streaming application 500.

At step S519, the proxy 510 may receive a request for a first video file for the second bitrate from the on-demand streaming application 500. Then, the proxy 510 may send a request for the first video file, a second video file, and a third video file for the second bitrate to the on-demand streaming server 520. In response to this request, the proxy 510 may receive the first video file, the second video file, and the third video file from the on-demand streaming server 520.

At step S519, the proxy 510 may transmit the first video file to the on-demand streaming application 500. Thereafter, when the proxy 510 receives a request for the second video file from the on-demand streaming application 500, the proxy 510 may transmit the pre-fetched second video file to the on-demand streaming application 500. Thereafter, when the proxy 510 receives a request for the third video file from the on-demand streaming application 500, the proxy 510 may transmit the pre-fetched third video file to the on-demand streaming application 500.

Figure 6:
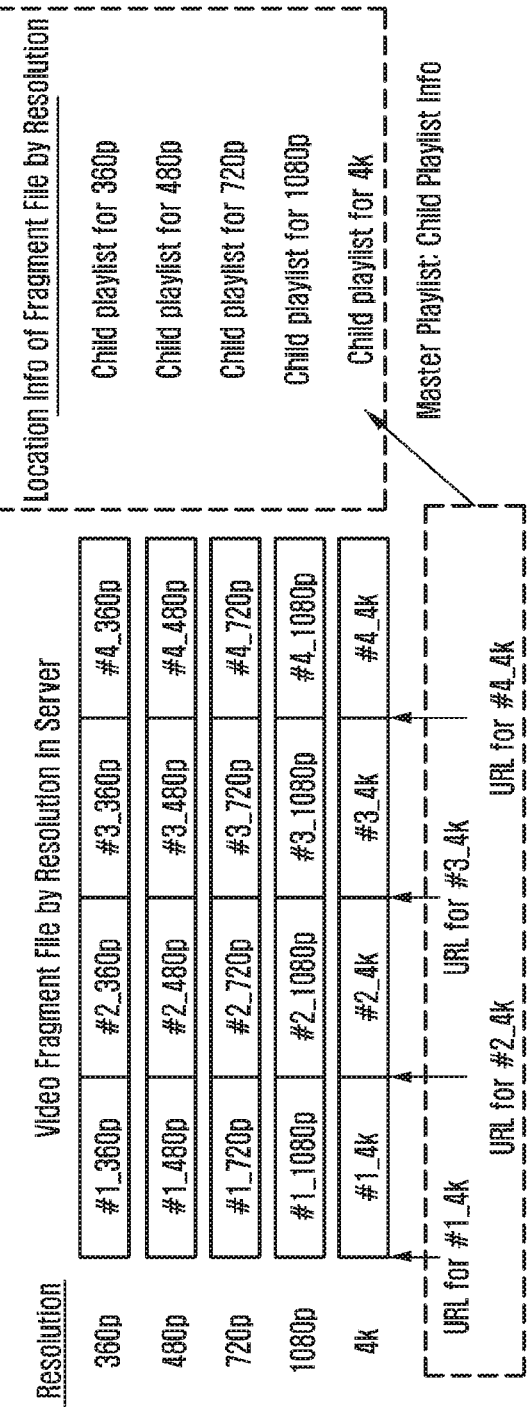
FIG. 6 illustrates a conceptual diagram of a master playlist and a child playlist.

FIG. 6 illustrates a conceptual diagram of a master playlist and a child playlist.

In case of a streaming service that provides multi-bitrate, the terminal may send a request for metadata to the server. The metadata may include a master playlist and a child playlist.

At this time, the master playlist may refer to a resolution (or bitrate) list provided by the server with respect to the requested streaming data. The master playlist may include child playlist information.

The child playlist may refer to a fragment file list of each resolution (or bitrate).

Figure 7:
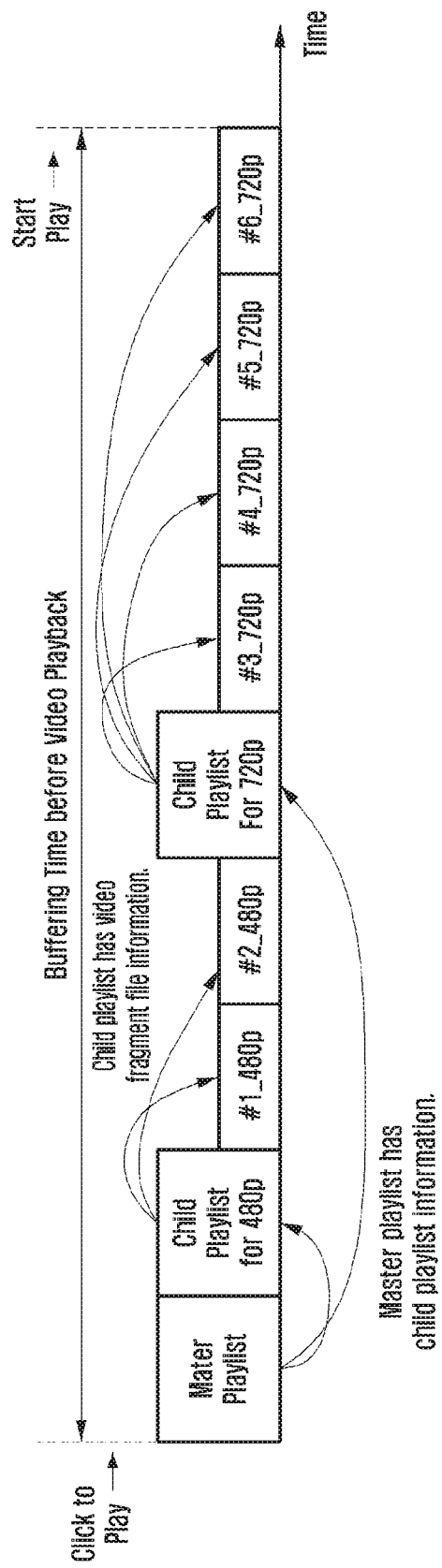
FIG. 7 illustrates a diagram of a buffering time corresponding to the streaming method illustrated in FIG. 4.
Figure 8:
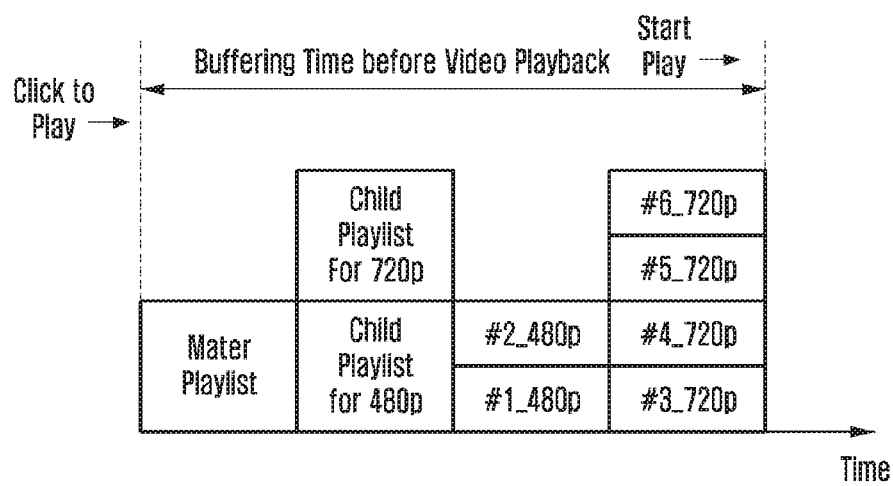
FIG. 8 illustrates a diagram of a buffering time corresponding to the streaming method illustrated in FIG. 5.

FIG. 7 illustrates a diagram of a buffering time corresponding to the streaming method shown in FIG. 4, and FIG. 8 illustrates a diagram of a buffering time corresponding to the streaming method shown in FIG. 5.

Here, the master playlist may have child playlist information, and the child playlist may have fragment file information for each resolution (or bitrate).

Referring to FIGS. 4 and 7, the buffering time before a user clicks play and a streaming service is provided, that is, the buffering time before the video playback, should include a time required for sequentially obtaining child playlists for specific resolutions from the master play list and a time required for sequentially obtaining corresponding video files from each child playlist.

Referring to FIGS. 5 and 8, the buffering time before the video playback should include a time required for obtaining first pre-fetched child playlists from the master playlist through a multi-session and a time required for obtaining second pre-fetched video file from each of the child playlists through a multi-session.

Comparing FIG. 8 with FIG. 7, it is seen that the buffering time before the video playback is greatly reduced in the case of FIG. 8 using pre-fetching and multi-session.

Figure 9:
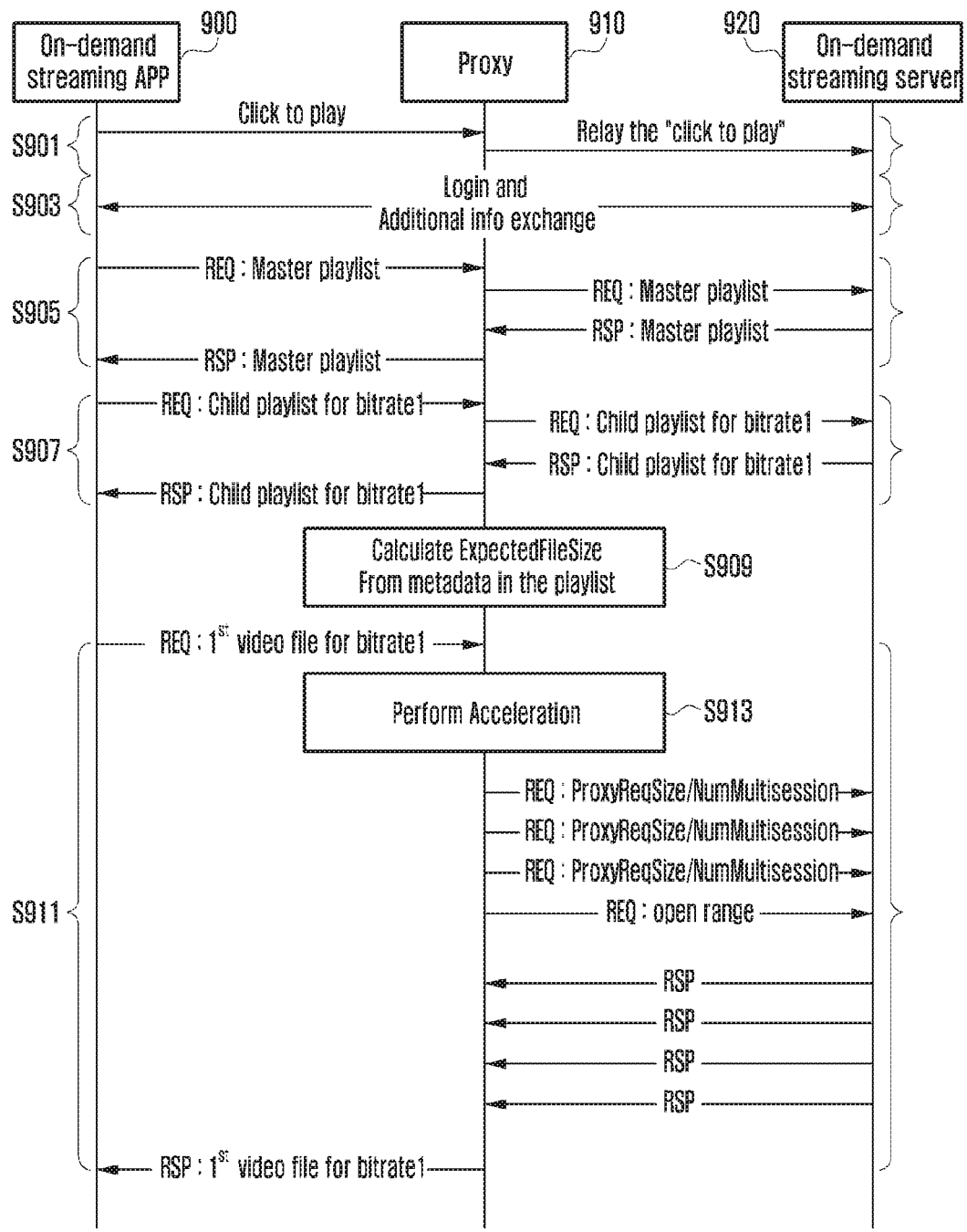
FIG. 9 illustrates a sequence diagram of a streaming based on a fragment file list of each bitrate according to another embodiment of the present disclosure.

FIG. 9 illustrates a sequence diagram of streaming based on a fragment file list of each bitrate according to another embodiment of the present disclosure.

Referring to FIG. 9, at step S901, an on-demand streaming application 900 may send a request for streaming data to an on-demand streaming server 920 via a proxy 910 in response to a click to play.

At step S903, the on-demand streaming application 900 may log in the on-demand streaming server 920 via the proxy 910, and may exchange additional information.

At step S905, the on-demand streaming application 900 may send a request for a master playlist to the proxy 910. Then the proxy 910 may deliver the request to the on-demand streaming server 920 and receive the master playlist from the on-demand streaming server 920. Thereafter, the proxy 910 may transmit the master playlist to the on-demand streaming application 900.

At step S907, the on-demand streaming application 900 may send a request for a first child playlist for a first bitrate to the proxy 910. Then the proxy 910 may deliver this request to the on-demand streaming server 920 and receive the first child playlist from the on-demand streaming server 920. Thereafter, the proxy 910 may transmit the first child playlist to the on-demand streaming application 900.

A method shown in FIG. 9 that requests only a part of a streaming-expected file is different from a method shown in FIG. 5 that requests the entire streaming-expected file.

In case of requesting only a part of the streaming-expected file, the amount of data (ProxyReqSize) requested by the proxy 910 is expressed by Equation 6 below.

$$\text{ProxyReqSize} = \text{ExpectedFileSize} + \text{PrefetchSize}$$

$$\text{ExpectedFileSize} = \text{BANDWIDTH} \times \text{TARGETDURATION}/8 \text{ [byte]})$$

$$\text{PrefetchSize} = [\text{default}, \text{minimum}, \text{maximum}] \quad \text{[Equation 6]}$$

<PrefetchSize Increase Condition>

Same as NumPrefetchFiles Increase Condition, increasing by the given IncreasePortion <PrefetchSize Decrease Condition>

Same as NumPrefetchFiles Decrease Condition, decreasing by the given DecreasePortion Namely, at step S909, the proxy 910 may calculate the requested data amount when only a part of the streaming-expected file is requested. The requested data amount may be determined by adding an expected file size (ExpectedFileSize) and a pre-fetch size (PrefetchSize).

At step S911, the proxy 910 may receive a request for a first video file for the first bitrate from the on-demand streaming application 900. At step S913, the proxy 910 may perform acceleration.

According to the result of the acceleration, the proxy 910 may send a request for the requested data amount (ProxyReqSize) to the on-demand streaming server 920 a number of times corresponding to the number of multiple sessions, and may receive the requested data amount (ProxyReqSize) from the on-demand streaming server 920. The proxy 910 may transmit the first video file corresponding to the requested data amount (ProxyReqSize) to the on-demand streaming application 900.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for operating a terminal providing a streaming service, the method comprising:
   detecting a streaming operation for the streaming service;
   identifying a request type for the streaming service when the streaming service is a streaming acceleration supportable service;
   estimating a network status associated with the detected streaming operation including at least one of a bandwidth and a per-session throughput;
   determining a number of multiple sessions for simultaneously receiving at least one of metadata and streaming data from a streaming server, based on the estimated network status;
   performing a streaming acceleration for the detected streaming operation based on the determined number of multiple sessions, wherein the streaming acceleration is performed according to the request type for the streaming service, and wherein performing the streaming acceleration includes pre-fetching, using the number of multiple sessions, at least one of the metadata and the streaming data in units corresponding to the request type for the streaming service; and
   sharing a rule associated with the streaming acceleration with a server.

2. The method of claim 1, wherein the detecting a streaming operation includes:
   checking whether the streaming service is a streaming acceleration supportable service.

3. The method of claim 1, further comprising calculating, using the metadata, a size of the streaming data to be requested from the streaming server.

4. The method of claim 1, further comprising:
   setting an activation condition for the streaming acceleration; and
   performing the streaming acceleration when the activation condition is satisfied.

5. The method of claim 1, wherein the pre-fetching is performed in a file unit when the request type for the streaming service is a file based request, and
   wherein the pre-fetching is performed in a byte unit when the request type for the streaming service is a byte based request.

6. The method of claim 1, wherein the pre-fetching includes:
   pre-fetching a child playlist by using a master playlist received from the streaming server; and
   pre-fetching the streaming data for the child playlist requested by a streaming application.

7. The method of claim 6, wherein the master playlist includes a bitrate list with respect to the streaming data.

8. The method of claim 6, wherein the child playlist includes a video fragment file list.

9. A terminal providing a streaming service, comprising:
   a transceiver configured to transmit and receive signals; and
   a controller configured to:
   detect a streaming operation for the streaming service;
   identify a request type for the streaming service when the streaming service is a streaming acceleration supportable service;
   estimate a network status associated with the detected streaming operation including at least one of a bandwidth and a per-session throughput;
   determine a number of multiple sessions for simultaneously receiving at least one of metadata and streaming data from a streaming server, based on the estimated network status;
   perform a streaming acceleration for the detected streaming operation based on the determined number of multiple sessions, wherein the streaming acceleration is performed according to the request type for the streaming service;
   pre-fetch, using the number of multiple sessions, at least one of the metadata and the streaming data in units corresponding to the request type for the streaming service; and
   share a rule associated with the streaming acceleration with a server.

10. The terminal of claim 9, wherein the controller is further configured to calculate, using the metadata, a size of the streaming data to be requested from the streaming server.

11. The terminal of claim 9, wherein the controller is further configured to:
    set an activation condition for the streaming acceleration; and
    perform the streaming acceleration when the activation condition is satisfied.

12. The terminal of claim 9, wherein the controller is further configured to:
    check whether the streaming service is a streaming acceleration supportable service.

13. The terminal of claim 9, wherein the controller is further configured to:
    perform the pre-fetch in a file unit when the request type for the streaming service is a file based request; and
    perform the pre-fetching in a byte unit when the request type for the streaming service is a byte based request.

14. The terminal of claim 9, wherein the controller is further configured to:
    pre-fetch a child playlist by using a master playlist received from the streaming server; and
    pre-fetch the streaming data for the child playlist requested by a streaming application.

15. The terminal of claim 14, wherein the master playlist includes a bitrate list with respect to the streaming data.

16. The terminal of claim 14, wherein the child playlist includes a video fragment file list.

* * * * *